US006136442A

United States Patent [19]

Wong

[11] Patent Number: 6,136,442

[45] Date of Patent: Oct. 24, 2000

[54] MULTI-LAYER ORGANIC OVERCOAT FOR PARTICULATE TRANSPORT ELECTRODE GRID

[75] Inventor: Kaiser H. Wong, Torrance, Calif.

[73] Assignee: Xerox Corporation, Stamford, Conn.

[21] Appl. No.: 09/163,825

[22] Filed: Sep. 30, 1998

[51] Int. Cl.[7] .............................. B32B 27/36; B32B 15/04

[52] U.S. Cl. .............................................. 428/412; 428/457

[58] Field of Search ..................................... 428/412, 327, 428/36.9, 343, 457; 430/59

[56] References Cited

U.S. PATENT DOCUMENTS

| | | | |
|---|---|---|---|
| 2,573,143 | 10/1951 | Jacob | 178/5.2 |
| 2,577,894 | 12/1951 | Jacob | 346/75 |
| 3,572,591 | 3/1971 | Brown | 239/337 |
| 3,977,323 | 8/1976 | Pressman et al. | 101/426 |
| 4,019,188 | 4/1977 | Hochberg et al. | 346/75 |
| 4,106,032 | 8/1978 | Miura et al. | 346/140 R |
| 4,113,598 | 9/1978 | Jozwiak, Jr. et al. | 204/181 R |
| 4,171,777 | 10/1979 | Behr | 239/422 |
| 4,189,937 | 2/1980 | Nelson | 73/28 |
| 4,271,100 | 6/1981 | Trassy | 261/78 A |
| 4,284,418 | 8/1981 | Andres | 55/16 |
| 4,368,850 | 1/1983 | Szekely | 239/333 |
| 4,490,728 | 12/1984 | Vaught et al. | 346/1.1 |
| 4,500,895 | 2/1985 | Buck et al. | 346/140 R |
| 4,515,105 | 5/1985 | Danta et al. | 118/629 |
| 4,544,617 | 10/1985 | Mort et al. | 430/58 |
| 4,606,501 | 8/1986 | Bate et al. | 239/346 |
| 4,613,875 | 9/1986 | Le et al. | 346/140 R |
| 4,634,647 | 1/1987 | Jansen et al. | 430/84 |
| 4,647,179 | 3/1987 | Schmidlin | 355/3 DD |
| 4,663,258 | 5/1987 | Pai et al. | 430/57 |
| 4,666,806 | 5/1987 | Pai et al. | 430/57 |
| 4,683,481 | 7/1987 | Johnson | 346/140 R |
| 4,720,444 | 1/1988 | Chen | 430/58 |

(List continued on next page.)

FOREIGN PATENT DOCUMENTS

| | | |
|---|---|---|
| 58-224760 | 12/1983 | Japan . |
| 4-158044 | 6/1992 | Japan . |
| 4-182138 | 6/1992 | Japan . |
| 5-4348 | 1/1993 | Japan . |

(List continued on next page.)

OTHER PUBLICATIONS

U. S. Application No, kk/kkk,kkk (Attorney Docket D/98566), Organic Overcoat For Electrode Grid, Filed Sep. 30, 1998, 09/163664.

F. Anger, Jr. et al. Low Surface Energy Fluoro–Epoxy Coating for Drop–On–Demand Nozzles, *IBM Technical Disclosure Bulletin*, vol. 26, No. 1, P. 431, Jun. 1983.

N. A. Fuchs. The Mechanics of Aerosols, *Dover Publications, Inc.*, P. 79, 367–377, 1989 (Originally published in 1964 by Pergamon Press Ltd.).

Hue Le et al. Air–Assisted Ink Jet With Mesa–Shaped Ink–Drop–Forming Orifice, Presented at the Fairmont Hotel in Chicago and San Jose, Fall 1987, P. 223–227.

No author listed, Array Printers Demonstrates First Color Printer Engine, *The Hard Copy Observer Published by Lyra Research, Inc.*, vol. VIII, No. 4, P. 36, Apr. 1998.

*Primary Examiner*—D. S. Nakarani
*Assistant Examiner*—Monique R. Jackson

[57] ABSTRACT

A multi-layer organic, top-surface, semiconducting dielectric overcoat, having a selected time constant permits electric field charge and dissipation at a selected rate to facilitate particulate material movement over an underlying electrode grid. The coating may be made from a first layer including an oxidant, and a second layer thereover which omits said oxidant. Each layer may further include a compound including a polymer such as bisphenol A polycarbonate, and a charge transport molecule such as m-TBD. A planarized, wear resistant, chemically stable surface, with minimized inter-electrode build-up are also provided by the overcoat.

5 Claims, 1 Drawing Sheet

U.S. PATENT DOCUMENTS

| | | | |
|---|---|---|---|
| 4,728,969 | 3/1988 | Le et al. | 346/140 R |
| 4,741,930 | 5/1988 | Howard et al. | 427/265 |
| 4,760,005 | 7/1988 | Pai | 430/65 |
| 4,770,963 | 9/1988 | Pai et al. | 430/64 |
| 4,839,232 | 6/1989 | Morita et al. | 426/473.5 |
| 4,839,666 | 6/1989 | Jayne | 346/75 |
| 4,870,430 | 9/1989 | Daggett et al. | 346/140 R |
| 4,882,245 | 11/1989 | Gelorme et al. | 430/14 |
| 4,896,174 | 1/1990 | Stearns | 346/459 |
| 4,929,968 | 5/1990 | Ishikawa | 346/140 R |
| 4,961,966 | 10/1990 | Stevens et al. | 427/299 |
| 4,973,379 | 11/1990 | Brock et al. | 156/640 |
| 4,982,200 | 1/1991 | Ramsay | 346/75 |
| 5,030,536 | 7/1991 | Pai et al. | 430/127 |
| 5,041,849 | 8/1991 | Quate et al. | 346/140 R |
| 5,066,512 | 11/1991 | Goldowsky et al. | 427/14.1 |
| 5,190,817 | 3/1993 | Terrell et al. | 428/343 |
| 5,202,704 | 4/1993 | Iwao | 346/140 R |
| 5,208,630 | 5/1993 | Goodbrand et al. | 355/201 |
| 5,209,998 | 5/1993 | Kavassalis et al. | 430/106 |
| 5,240,153 | 8/1993 | Tubaki et al. | 222/385 |
| 5,240,842 | 8/1993 | Mets | 435/172.3 |
| 5,300,339 | 4/1994 | Hayes et al. | 428/36.9 |
| 5,350,616 | 9/1994 | Pan et al. | 428/131 |
| 5,385,803 | 1/1995 | Duff et al. | 430/138 |
| 5,425,802 | 6/1995 | Burton et al. | 95/32 |
| 5,426,458 | 6/1995 | Wenzel et al. | 347/45 |
| 5,428,381 | 6/1995 | Hadimioglu et al. | 347/46 |
| 5,482,587 | 1/1996 | McAleavey | 156/243 |
| 5,512,712 | 4/1996 | Iwata et al. | 174/258 |
| 5,520,715 | 5/1996 | Oeftering | 75/335 |
| 5,522,555 | 6/1996 | Poole | 241/33 |
| 5,535,494 | 7/1996 | Plesinger et al. | 29/25.35 |
| 5,541,625 | 7/1996 | Holstun et al. | 347/5 |
| 5,554,480 | 9/1996 | Patel et al. | 430/137 |
| 5,600,351 | 2/1997 | Holstun et al. | 347/40 |
| 5,654,744 | 8/1997 | Nicoloff, Jr. et al. | 347/43 |
| 5,678,133 | 10/1997 | Siegel | 399/67 |
| 5,712,669 | 1/1998 | Swanson et al. | 347/49 |
| 5,717,986 | 2/1998 | Vo et al. | 399/291 |
| 5,756,190 | 5/1998 | Hosomi et al. | 428/209 |
| 5,761,783 | 6/1998 | Osawa et al. | 29/25.35 |
| 5,787,558 | 8/1998 | Murphy | 29/25.35 |
| 5,853,906 | 12/1998 | Hsieh | 428/690 |
| 5,882,830 | 4/1998 | Visser et al. | 430/59 |
| 5,893,015 | 4/1999 | Mojarradi et al. | 399/291 |
| 5,968,674 | 10/1999 | Hsieh et al. | 428/690 |
| 5,981,043 | 11/1999 | Murakami et al. | 428/209 |
| 5,982,404 | 11/1999 | Iga et al. | 347/173 |

FOREIGN PATENT DOCUMENTS

| | | |
|---|---|---|
| 5-193140 | 8/1993 | Japan . |
| 5-269995 | 10/1993 | Japan . |
| WO 93/11866 | 6/1993 | WIPO . |
| WO 94/18011 | 8/1994 | WIPO . |
| WO 97/01449 | 1/1997 | WIPO . |
| WO 97/27058 | 7/1997 | WIPO . |

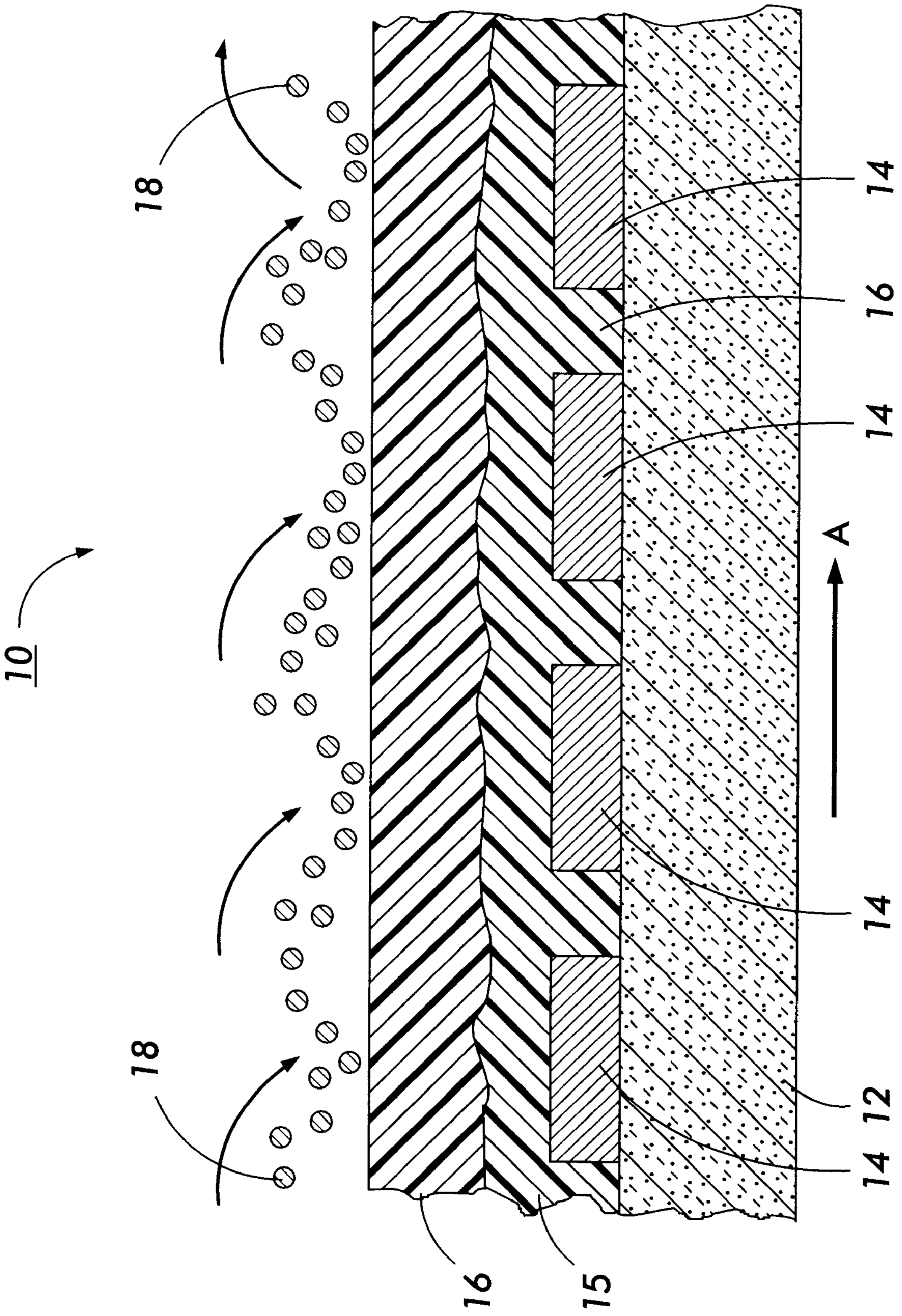
10
18
18
14
16
14
14
14
12
A
16
15

MULTI-LAYER ORGANIC OVERCOAT FOR PARTICULATE TRANSPORT ELECTRODE GRID

CROSS-REFERENCE TO RELATED APPLICATIONS

The present invention is related to U.S. patent application Ser. Nos. 09/163,893, 09/164,124, 09/164,250, 09/163,808, 09/163,765, 09/163,839, 09/163,954, 09/163,924, 09/163,904, 09/163,999, 09/163,664, 09/163,518, 09/164,104, issued U.S. Pat. Nos. 5,717,986, 5,893,015, 5,968,674 and 5,853,906, and U.S. patent application Ser. No. 09/128,160, each of the above being incorporated herein by reference.

BACKGROUND

The present invention relates to the field of overcoat materials, and more specifically relates to overcoat materials functioning as relaxation coatings applied on electrode grids.

There are known or proposed systems for electrostatically agitating or moving fine particulate materials, such as marking material (e.g., toner) and the like. One such system is described in U.S. patent application Ser. No. 09/163,839, in which a grid of small and closely spaced electrodes are connected to a driver circuit such that a phased d.c. travelling electrostatic wave is established along the grid. Charged particulate material is transported by the electrostatic wave in a desired direction, at a desired velocity. Other such systems cause marking material particles to be agitated from a surface so as to be proximate a receiving surface such as a photoreceptor.

It is known to encapsulate electronic devices, such as integrated circuits, in protective coatings. Such coatings may provide physical protection from scratches, and a moisture barrier between the devices and the ambient environment. However, such materials are generally not used as top-surface dielectrics. Furthermore, such insulation and passivation layers typically have very high resistivities to avoid possible electrical shorts between covered leads.

We have discovered that there are a variety of criteria which overcoats for virtually all electrode grids of the type described above should address. First, it is desirable to provide a planarized surface over which the particulate material may reside or travel. Such a surface eliminates the problem of particulate material becoming trapped between the electrodes. Second, it is desirable to provide a material over the electrodes to provide rapid charge dissipation at a selected time constant. Third, arcing between electrodes must be prevented. Fourth, it is desirable that the overcoat provide a degree of wear resistance, especially in the case of marking material transport. Finally, it is important that such a layer be chemically stable. That is, the layer material must not react with the particulate material nor change characteristics in the presence of the operating environment. However, no known material to date has been able optimize each of these desired attributes.

SUMMARY

The present invention is a novel multi-layer coating, for application over e.g. an electrode grid, addressing the shortfalls of the prior art. The coating comprises at least first and second organic polymer layers, deposited over the metal electrodes of an electrode grid, protecting the metal electrodes from being affected by chemical, mechanical, and electrical environments. Arcing between electrodes is eliminated by the coating, which does not break down in the high voltage regime typically employed by particulate material moving grids (e.g., in the range of 400 volts or more). Forming the coating sufficiently thick to allow establishing a planar surface eliminates the accumulation of particulate material interstitially between electrodes.

The coating is a top-surface (that is, not sandwiched between layers) semiconducting dielectric, having a selected time constant to permit electric field charge and dissipation at a selected rate to permit particulate material agitation or movement over an underlying electrode grid.

In general, the coating is comprised of a first, lower layer including a polymeric binder (e.g., a polycarbonate such as MAKROLON 3108, a bisphenol A polycarbonate available from Bayer Polymers Division), a charge transport molecule (e.g., N,N'-bis(3-methylphenyl)-N,N'-diphenyl-(1,1'-biphenyl)-4,4"-diamine, also known as m-TBD), a chemical dopant (e.g., oxidant), and solvents (e.g., methylene chloride, 1,1,2-trichloroethane) to dissolve the aforesaid chemicals. A second, upper layer includes similar materials, with the exception that the chemical dopant is eliminated.

According to one embodiment, one or both of the layers comprise a combination, inter alia, of MAKROLON 3108, a bisphenol A polycarbonate m-TBD, and the solvents methylene chloride and 1,1,2-trichloroethane. According to another embodiment, one or both of the layers are a combination, inter alia, of MAKROLON 3108, a bisphenol A polycarbonate m-TBD, the solvents methylene chloride and 1,1,2-trichloroethane, and (di-tert-butylphenyl) iodonium hexafluoroarsenate. Still another embodiment, one or both of the layers are a combination, inter alia, of MAKROLON 3108, a bisphenol A polycarbonate m-TBD, the solvents methylene chloride and 1,1,2-trichloroethane, and a cation salt of TM-TBD (tetramethyl-TBD) together with silver trifluoroacetate. One method of application is use of a low pressure, high volume spray gun to spray coat to a desired thickness, for example between about 10–40 μm per layer. The overall coating thickness is a function of the electrode thickness, and should be sufficient to provide a planar surface.

However, since one application of the present invention may be a coating overlying a flexible substrate, in such an application a thick coating (e.g., a combined thickness of 50 μm or more) may crack when the electrode substrate is bent to conform to a particular shape. The thinner the electrode, the thinner the required coating, and the easier the polishing procedure. And, the thinner the electrode, the easier it is to achieve planarization. However, thickness will be a function of the desired application.

Following drying, the spray coated electrode grid is polished to produce a smooth, planar surface. One of many known polishing techniques is employed, such as polishing with successively finer abrasives.

The time constant of the coating (again, both layers taken together), as determined by the product of the dielectric constant and the resistivity of the layers, is preferably between 1–100 microseconds (ms) although time constants up to 1 second may be achieved by the present invention. Within this range of time constants, particulate material may be either agitated to a desired height or moved from electrode to electrode, across a grid of electrodes at a speed about 1 to 2 meters per second (m/s). However, in the case of a particle moving grid, the larger the time constant, the slower the speed of movement of the particulate material across the electrode grid. The bulk resistivity of the coating is preferably between $1\times10^{9}$ and $1\times10^{12}$ ohm·centimeters (Ω·cm). The dielectric constant of the coating should be in the range of 4 to 12.

Thus, the present invention and its various embodiments provide numerous advantages discussed above, as well as additional advantages which will be described in further detail below.

BRIEF DESCRIPTION OF THE DRAWINGS

A more complete appreciation of the invention and many of the attendant advantages thereof will be readily obtained and understood by referring to the following detailed description and the accompanying drawing. The drawing, briefly described below, is not to scale.

FIG. 1 is a cross-sectional illustration of a grid-type particulate particle mover having a multi-layer overcoat thereon according to the present invention.

DETAILED DESCRIPTION

In the following detailed description, numeric ranges are provided for various aspects of the embodiments described, such as pressures, temperatures, thicknesses, voltage, frequency, etc. These recited ranges are to be treated as examples only, and are not intended to limit the scope of the claims hereof. In addition, a number of materials are identified as suitable for various facets of the embodiments, such as for marking materials, layer materials, etc. These recited materials are also to be treated as exemplary, and are not intended to limit the scope of the claims hereof.

With reference now to FIG. 1, there is shown therein in cross-section one embodiment 10 of a grid of electrodes 14 formed on a substrate 12. Embodiment 10 is an example of a marking material particle mover, but it should be recognized that the function of the underlying grid does not limit the scope of the present invention. The present invention is applicable over grids serving other functions (not shown) such as particle agitation, etc.

Overlying the grid of electrodes 14 is a first organic overcoat layer 15 according to the present invention. Overlying the first overcoat layer 15 is second organic overcoat layer 16. Other layers (not shown) may form a part of an embodiment of the type shown in FIG. 1, such as interface layers, electrical interconnection layers, etc. In addition, the geometry of an embodiment may vary from that shown in FIG. 1 (although not shown herein). For example electrodes may be formed to have a different profile and thickness, and may be formed in differing locations on the substrate. In any case, a traveling electrostatic wave produced by means not shown causes particulate material 18 to travel from electrode to electrode in the direction of arrow A.

Electrodes 14 are typically constructed of copper, for example 10–25 microns thick, although they may be formed of other materials. A common process for the formation of electrodes 14 is by wet chemical etching of a photolithographically defined copper electrode pattern on Kapton (polyimide film), a common practice in the art of flexible circuit. Two important criteria for the overcoat of the present invention are that (1) the process used to form it not negatively affect the electrodes or substrate, and (2) that the material from which it is formed not negatively interact with the electrodes or the substrate.

According to one embodiment of the present invention, first layer 15 is formed of a solution consisting of a polymer such as MAKROLON 3108, a bisphenol A polycarbonate (3.14 wt. %), a charge transport agent such as m-TBD (1.70 wt. %), an oxidant such as cation salts of TM-TBD (0.78 wt. % with respect to m-TBD) and silver trifluoroacetate (0.83 wt. % to m-TBD), and a solvent such as methylene chloride (56.7 wt. %), and 1,1,2-trichloroethane (38.4 wt. %). It should be noted, however, that the cation salts may range from 0.25 wt. % to 2.5 wt. % with respect to m-TBD, and silver trifluoroacetate may range from 0.25 wt. % to 2.6 wt. % with respect to m-TBD, while the other components remain as stated.

In general, the polymer for such a solution may be selected from the group comprising a polycarbonate (e.g., MAKROLON 3108, 3208, 5705, or PCZ 200, 400), a polyvinylcarbazole, or cellulose acetate butyrate. Also the charge transport agent for such a solution may be selected from the group comprising m-TBD, p-TBD, TM-TBD, and dihydroxy m-TBD. In addition to or in place of methylene chloride and 1,1,2-trichloroethane, a number of other solvents may be employed.

A particle mover electrode grid (for example 25 μm thick copper electrodes with 75 μm electrode width and spacing on a 50 μm thick polyimide film) is cleaned by submicron aluminum oxide slurry, then neutralized with very diluted hydrochloric acid (about 0.1%, or equivalent acidic solution) and to remove any oxidized layer on the metal electrodes. A de-ionized water rinse is the next step. As an indication that no contamination is left on the electrode grid, the grid should be wettable by the DI water rinse. The uncoated electrode grid is air-blow dried and then dried in an oven at 40° C. for 10 to 15 minutes.

Using a low pressure, high volume spray gun, the electrode grid is spray coated with the first layer coating solution under a fume hood to obtain a coating thickness of between 10 and 40 μm. The coated electrode grid is next air-dried under a fume hood for 10 to 15 minutes, then placed in an oven at 40° C. for 2 hours. The grid is then placed in a vacuum oven operating at about 4.5 Torr, purging with nitrogen. The grid is baked inside the vacuum oven through a drying cycle of 2 hrs at 40° C., one hour at 50° C. and 2 hours at 65° C. The purpose of the series of drying steps is to minimize rapid outgassing of solvents from the coating, to in turn minimize any bubble formation in the dried coating layer.

After drying, the first layer organic coating is polished using successively finer diamond polishing compounds. For example, a starting compound may have a particle size of 6 μm particles, then a compound of 3 μm particles, then 1 μm particles to produce a smooth surface. With sufficient initial thickness of the first overcoat layer, a planar surface may thereby obtained. However, planarization at this stage is not required in every case, as the second layer, to be applied over the first layer, may be sufficiently thick that polishing of said second layer may provide the desired planar uppermost surface.

The time constant of the first layer organic film should range from about 1 ms to about 100 ms. The ultimate thickness of the first layer will depend on the electrode metal thickness. For 25 μm thick metal electrodes, an overcoat layer thickness on the order of 30 to 35 μm before polishing will suffice. During the polishing process approximately 5 μm of the coating would be polished off.

Thus, the first layer organic overcoat may be tailored to have a resistivity on the order of between $1\times10^{9}$ and $1\times10^{11}$ Ω-cm. This is significantly lower than the resistivity of a typical insulation or passivation layer, which would be on the order of $10^{14}$ to $10^{16}$ Ω-cm. The time constant (τ) for the overcoat is related to the resistivity (ρ) and the dielectric constant (∈), as:

$$\tau=\rho\cdot\in$$

A desired time constant for the proper establishment then dissipation of an electric field for particulate transport at a reasonable speed (1 to 2 m/s) is in the range of 1–100 ms. However, time constants up to, for example 1 second, are contemplated hereby, with the consequent reduction in particulate material transport speed. Indeed, a desired transport speed may be obtained by properly selecting the time constant of the layer (i.e., adjusting the resistivity) and selecting the optimal operating conditions such as voltage and frequency.

In the present embodiment, the desired resistivity of first layer 15 may be obtained by controlling either one or both of the concentrations (wt. %) of the oxidant or m-TBD in the coating composition. The first layer 15 may be tailored to have a resistivity on the order of between $1\times10^{9}$ and $1\times10^{11}$ Ω-cm, and preferably between $1\times10^{9}$ Ω-cm and $1\times10^{10}$ Ω-cm, or even between $1\times10^{9}$ Ω-cm and $5\times10^{9}$ Ω-cm.

As an alternative first layer, the solution may be comprised of Makrolon 3108 (2.90 wt. %), m-TBD (1.94 wt. %), (di-tert-butylphenyl)iodonium hexafluoroarsenate (0.235 wt. % with respect to m-TBD), methylene chloride (56.8 wt. %), and 1,1,2-trichloroethane (38.4 wt. %). However, the oxidant (di-tert-butylphenyl)iodonium hexafluoroarsenate may vary from 0.2 wt. % to 2.0 wt. % with respect to m-TBD, while the remaining components would have the proportions indicated. The preparation and application process is essentially as described above, with the exception that 2 minutes of exposure to UV radiation is required to obtain semiconductive properties of the layer. The resulting characteristics of the first layer according to this embodiment are substantially as stated above.

It has been observed, however, that the coating of this example appears to be a dynamic chemical system. Reactions altering the system characteristics may be initiated in-situ, producing polymer chain fragmentation which could be responsible for cracking and crazing. These changes may also directly impact the electrical properties of the system. Experimental results from a stress-aged film (samples being placed in a humidity chamber at 50° C. and 80–100% relative humidity for 24 days) showed losses in molecular weight and emergence of new peaks in the oligomeric region containing both charge transport molecule cation radicals and polymer fragments. This signals that chemical changes occurred in the system. Application of second layer 16 over this embodiment of first layer 15 serves to protect the first layer 15 from the effects of exposure to the environment, and at least partially stabilizes the system.

According to one embodiment of the second layer of a coating according to the present invention, a solution consisting of a polymer such as 18.8 grams (about 3.1 wt. %) of MAKROLON 3108 (bisphenol A polycarbonate), a charge transport agent such as 10.2 grams of m-TBD (1.7 wt. %) in 340 grams (about 56.8 wt. %) of methylene chloride and 230 grams (about 38.4 wt. %) of 1,1,2-trichloroethane is prepared. In general, the polymer may be selected from the group comprising a polycarbonate (e.g., MAKROLON 3108, 3208, 5705, or PCZ 200, 400), a polyvinylcarbazole, or cellulose acetate butyrate. Also the charge transport agent may be selected from the group comprising m-TBD, p-TBD, TM-TBD, and dihydroxy m-TBD. In addition to or in place of methylene chloride and 1,1,2-trichloroethane, a number of other solvents may be employed. Importantly, the oxidant material is omitted from this second layer solution. The resistivity of the second layer is controllable by varying the weight percentage of m-TBD (or equivalent).

The preparation and application process of second layer 16 is essentially as described above for first layer 15. The second layer solution is spray coated over the dried, polished, then cleaned first organic layer. The spray and drying conditions are essentially as previously stated, with the ultimate thickness of the second organic coating layer being in the range of 10–40 μm. Again, the second layer organic coating is polished using successively finer polishing compounds. With sufficient initial thickness of the second layer, a planarized upper surface 20 may be obtained.

A meaningful velocity of toner movement is 1 to 2 m/s at operating conditions such as 500 volt and 1.2 KHz frequency. Within a desired range of time constants, the velocity of toner movement is also a function of operating voltage and frequency. As a rule of thumb, the higher the voltage and frequency, the faster the velocity of toner movement. Resistivity and dielectric constant of the first and second layers together determine the time constant.

The resistivity of the second layer 16 is in the range of $1\times10^{10}$ and $1\times10^{12}$, with a dielectric constant of between 4 and 12. A target resistivity of the combined, multi-layer organic overcoat between $1\times10^{9}$ and $1\times10^{11}$ Ω·cm, and a dielectric constant of between 4 and 12 are thus obtainable, and may produce time constants in the range of 1–100 ms, which may produce a velocity of toner movement well within the required range of 1 to 2 m/s.

While the present invention has been discussed in terms of embodiments focussing on the combination of bisphenol A polycarbonate, m-TBD, methylene chloride, and 1,1,2-trichloroethane, it will be apparent to one skilled in the art that various embodiments of a multi-layer organic coating for a particulate marking material transport device are contemplated herein. Furthermore, while embodiments described and alluded to herein are capable of providing an adequate overcoat for devices including electrode grids, such as particulate marking material movers, the present invention is not limited to marking material or particle movement, but may find applicability in a variety of other environments requiring an overcoat. Thus, it should be appreciated that the description herein is merely illustrative, and should not be read to limit the scope of the invention nor the claims hereof.

What is claimed is:

1. An organic top-surface coating for a particulate transport electrode grid, comprising:

a first organic coating layer located over said particulate transport electrode grid, said first organic coating layer comprising:

a polymer selected from the group consisting of polycarbonate, polyvinylcarbazole, or cellulose acetate butyrate;

a charge transport agent selected from the group consisting of m-TBD, p-TBD, TM-TBD, or dihydroxy m-TBD;

an oxidant selected from the group consisting of (di-tert-butylphenyl) iodonium hexafluoroarsenate, or cation salts of TM-TBD together with silver trifluoroacetate; and a second organic coating layer, in physical contact with and overlaying said first organic coating layer, said second organic coating layer comprising:

a polymer selected from the group consisting of polycarbonate, polyvinylcarbazole, or cellulose acetate butyrate; and a charge transport agent selected from the group consisting of m-TBD, p-TBD, TM-TBD, or dihydroxy m-TBD;

wherein said top surface coating has a time constant, a dielectric constant, and a resistivity, said time constant, determined by the product of the dielectric constant and the resistivity, being between 1 microsecond and 100 microseconds.

2. The organic coating of claim 1, wherein said time constant is between 50 and 100 microseconds.

3. The organic coating of claim 2, wherein said dielectric constant is between 4 and 12, and further wherein said resistivity is between $1\times10^{10}$ and $1\times10^{11}$ ohm-centimeters.

4. The organic coating of claim 1, wherein said polymer is bisphenol A polycarbonate.

5. The organic coating of claim 1, wherein said organic coating is polished so as to have a smooth and planarized upper surface.

* * * * *